Figure 1:
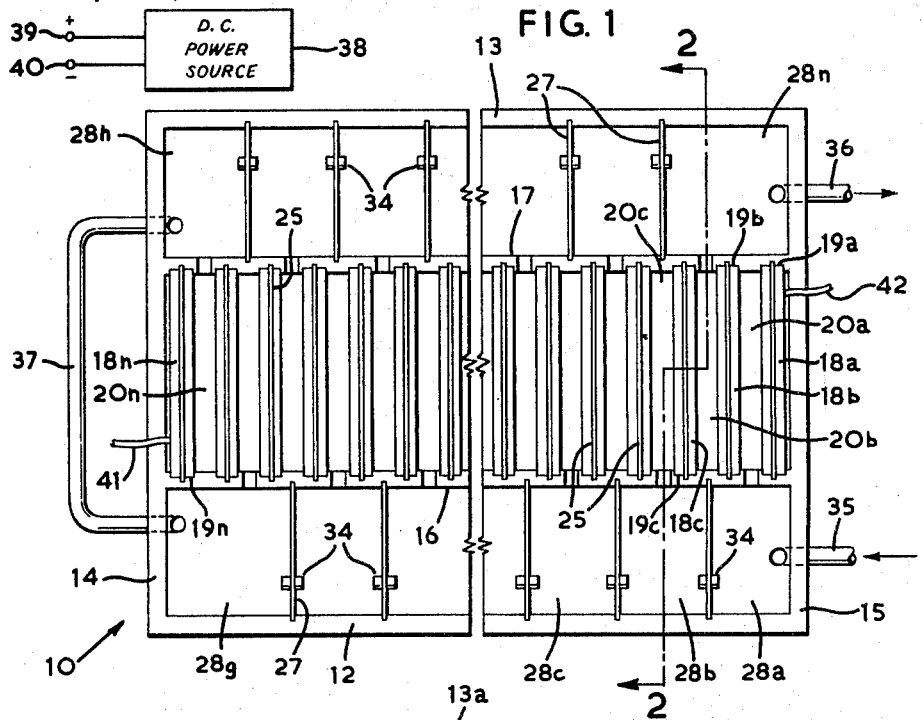

June 18, 1968 N. W. MEYERS 3,389,071

BIPOLAR ELECTROLYTIC CELL

Filed Sept. 27, 1965 2 Sheets-Sheet 1

INVENTOR.
NORMAN W. MEYERS
BY~ *Harold G. Fox*
ATTORNEY

INVENTOR.
NORMAN W. MEYERS 3,389,071
BIPOLAR ELECTROLYTIC CELL
Norman W. Meyers, Etobicoke, Ontario, Canada, assignor to Electric Reduction Company of Canada, Ltd., Toronto, Ontario, Canada
Filed Sept. 27, 1965, Ser. No. 490,198
Claims priority, application Canada, Aug. 7, 1965, 937,611
20 Claims. (Cl. 204—268)

This invention relates to bipolar electrolytic cells. More particularly, this invention relates to bipolar electrolytic cells particularly suited for the production of halates, perhalates, or hypohalites of alkali metals, especially sodium chlorate and sodium perchlorate.

In the past it has been common practice to produce sodium chlorate electrolytically by means of a bipolar electrolytic cell positioned in a large container or tank. A typical prior art bipolar electrolytic cell for such an end use consists of a housing in the form of a box having an open top and in which are positioned a large number of spaced-apart, parallel electrodes, usually of graphite. Electrical connections are made to two or more, but not all of the electrodes for supplying electrical energy to the cell. The electrodes are in effect connected in series electrically through the electrolyte in the cell. At the top and bottom of the housing on both sides thereof are tubes leading into the housing. A sufficient number of these tubes, which constitute inlet and outlet tubes, are provided to communicate with each one of the spaces between two adjacent electrodes. Every two adjacent electrodes and the space therebetween constitutes a unit cell. The housing is supported above the floor of the container or tank, the latter being filled with electrolyte.

The electrolyte enters each unit cell through the lower tubes, these being below the level of the electrolyte in the tank, is electrolysed in the unit cells, and the electrolysed solution is discharged to the tank via the upper tubes, the tank constituting a common reservoir for all unit cells. In many cases, circulation of the electrolyte from the tank to the unit cells and back to the tank is obtained without the use of pumps or other such circulating devices. However, a pump may be employed, if desired. In cases where the tank is positioned remote from the electrolytic cell, rather than having the electrolytic cell in the tank, some form of pumping arrangement is required.

Where sodium chlorate is being produced and the electrolyte is brine, the electrolytic cell usually is operated at an electrolyte temperature of 20° C. to 45° C., when graphite electrodes are employed, cooling of the electrolyte in the tank being required in order to maintain temperatures of this order. The principal desired reactions which take place in the electrolysis zone (each unit cell) are as follows:

$$2Cl^- \rightarrow Cl_2 + 2e \qquad (1)$$

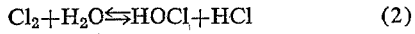

$$Cl_2 + H_2O \rightleftharpoons HOCl + HCl \qquad (2)$$

Undesirable side reactions which may take place in the electrolysis zone are as follows:

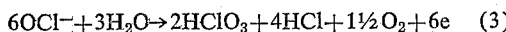

$$6OCl^- + 3H_2O \rightarrow 2HClO_3 + 4HCl + 1\frac{1}{2}O_2 + 6e \qquad (3)$$

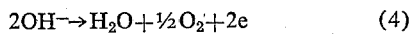

$$2OH^- \rightarrow H_2O + \frac{1}{2}O_2 + 2e \qquad (4)$$

$$C + O_2 \rightarrow CO_2 \qquad (5)$$

In the reaction zone (tank) the following reaction takes place:

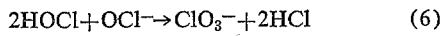

$$2HOCl + OCl^- \rightarrow ClO_3^- + 2HCl \qquad (6)$$

While electrolytic cells of the aforementioned type with their associated tanks are in widespread use, their use is subject to a number of disadvantages. Thus, as aforementioned inlet and outlet tubes are employed because of the necessity to minimize current leakage between adjacent unit cells. However, the use of tubes creates problems with respect to obtaining good circulation of electrolyte from and to the electrolytic cell when "natural circulation" is relied upon, and this naturally has an effect on efficiency.

Notwithstanding the use of such tubes, current leakage between unit cells of electrolytic cells of the type hereinbefore described and now in use does occur, and, in many cases, is a significant factor decreasing the efficiency of operation, since the tubes must be reasonably large to promote adequate circulation. Furthermore, the potential between an electrode in the electrolytic cell and the tank may be quite high, e.g., the end electrodes of the cell may be at +60 and —60 volts respectively, while the tank is at 0 volts, and this difference in potential promotes current leakage, the degree of current leakage being greater as the difference in potential increases.

With prior art electrolytic cells of the type hereinbefore described, the maximum voltage drop across the electrolytic cell which normally has been employed is about 120 volts.

From the point of view of current efficiency, in the production of sodium chlorate it is best to electrolyse a liquor having an NaCl concentration of the order of 300 g./l. However, for best chlorate crystal production cost, finished cell liquors normally should have an NaCl concentration of the order of 100 g./l. Consequently, if a prior art electrolytic cell of the type hereinbefore described is operated continuously, in order to produce a cell liquor having an NaCl concentration of the order of 100 g./l., the electrolytic cell must operate in a region of low current efficiency.

In the production of sodium chlorate by electrolysis, it is necessary to add hydrochloric acid to the electrolyte in order to control pH. In the past this has been and is done by adding HCl to the reaction zone. Relatively quiet pockets may be formed in the reaction zones of electrolytic apparatus of the aforementioned type, and because of lack of proper mixing, the addition of HCl may cause the pH of the solution in these pockets to fall quite low. This, in turn, may lead to the evolution of chlorine, which decreases the efficiency of the electrolytic process. Furthermore, the aforementioned pockets or dead zones decrease the effective reaction zone volume.

In the electrolytic apparatus of the aforementioned type with graphite electrodes, relatively expensive cooling coils are required to ensure that the solution in the electrolysis zone is kept at a temperature below about 40° C., since, above this temperature, the rate of attack of oxygen evolved during electrolysis on the graphite electrodes generally will be too high to be tolerated.

In contrast, in accordance with this invention, there is provided a bipolar electrolytic cell in which each unit cell has its own individual reaction zone. Long, small diameter inlet and outlet tubes connecting the reaction zones and unit cells may be eliminated. This factor can promote considerably improved circulation, a greater flow of electrolyte over the electrode faces and hence improved current efficiency.

When a bipolar electrolytic cell embodying this invention is operated on a batch or continuous basis, the electrolytic cell can be constructed so that there is virtually no current leakage between adjacent unit cells or adjacent reaction zones, because they are essentially isolated from each other. Even when adjacent unit cells are cascaded, which can be done by interconnecting the reaction zones, current leakage can be kept to a minimum, because the passages interconnecting the reaction zones can be made quite small, thereby establishing a path of of high electrical resistance.

Because a bipolar electrolytic cell embodying this invention can be arranged to have essentially no current leakage, voltages across the electrolytic cell in excess of 120 volts can be employed. This is advantageous, since rectifier cost and busbar cost decrease with increasing voltage, so that the cost of rectified current decreases with increasing voltage.

When a bipolar electrolytic cell embodying this invention is operated continuously, the various unit cells being cascaded, only the last unit cell need operate with a liquor having an NaCl concentration of the order of 100 g./l. (it will be recalled that such a salt concentration gives the best chlorate production cost), while the liquors in the other unit cells may graduate in NaCl concentration up to 300 g./l., where optimum current efficiency is obtained.

The improved electrolyte circulation which can be obtained in a bipolar electrolytic cell embodying this invention should avoid or reduce quiet pockets or "dead spots" in the reaction zones. Thus, the effective reaction zone volume should be essentially the whole of the available reaction zone volume, chlorine evolution problems due to low pH in quiet pockets and a resultant decrease in efficiency should be eliminated or minimized, and it may be possible, where cooling of the electrolyte is necessary, to employ less expensive cooling equipment in the reaction zones.

A bipolar electrolytic cell embodying this invention is particularly suited for use with bipolar electrodes of the type wherein the anode of the bipolar electrode is platinised titanium and the cathode thereof is some suitable material such as iron. Where electrodes of this type are employed, no cooling devices need be used, since the electrolyte may be permitted to boil. Under these conditions, the chemical reaction involved in forming chlorate from hypochlorite will proceed about six times as fast as in prior art apparatus of the type hereinbefore described using graphite electrodes. Hence, for the same amount of chlorate produced, the reaction zone of an electrolytic cell embodying this invention can be about one sixth of that of such prior art electrolytic apparatus.

A bipolar electrolytic cell embodying this invention includes a cell tank that has a bottom wall and side walls defining a chamber. At least three electrodes are positioned in the chamber in spaced-apart relationship with respect to each other. At least one of the these electrodes is a bipolar electrode. Each electrode of each set of two adjacent electrodes and the space therebetween constitutes a unit cell for the electrolysis of an electrolyte occupying the space between the two adjacent electrodes. The unit cells occupy only a first portion of the chamber defined by the tank, this first portion being spaced inwardly from the two side walls of the tank, as a result of which second and third portions of the chamber are defined between the aforementioned first portion and the aforementioned two side walls. Partitioning means are provided that partition at least a part of the second and third portions of the chamber into a plurality of individual chambers. Each one of these individual chambers is connected in liquid-flow relationship with a different one of the unit cells for passage of electrolyte into respective ones of the units cells from the individual chambers connected thereto and out of respective ones of the unit cells into the individual chambers connected thereto. The total volume defined by the individual chambers plus that of the spaces between adjacent electrodes constitutes substantially the only volume provided for chemical reactions as a result of electrolysis of the electrolyte to take place in the electrolyte. In accordance with this invention, even numbered ones of the units cells are connected in liquid-flow relationship with only those ones of the individual chambers in the second portion of the chamber defined by the tank, while odd numbered ones of the unit cells are connected in liquid-flow relationship with only those ones of the individual chambers that are in the third portion of the chamber defined by the tank.

Figure 2:
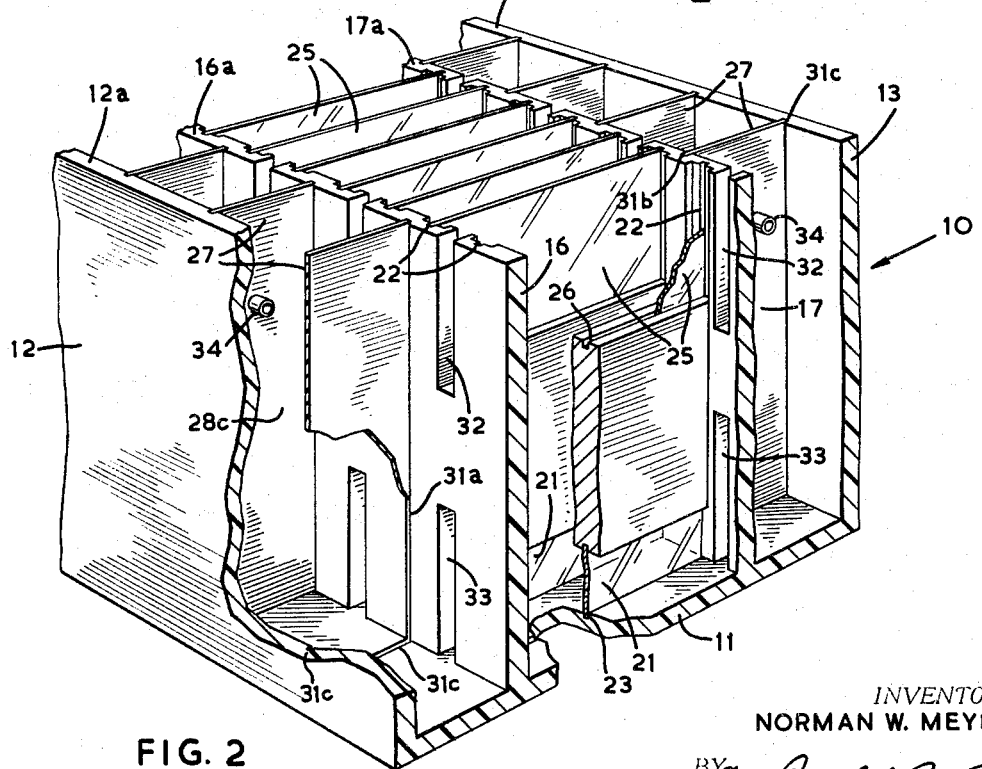
Figure 3:
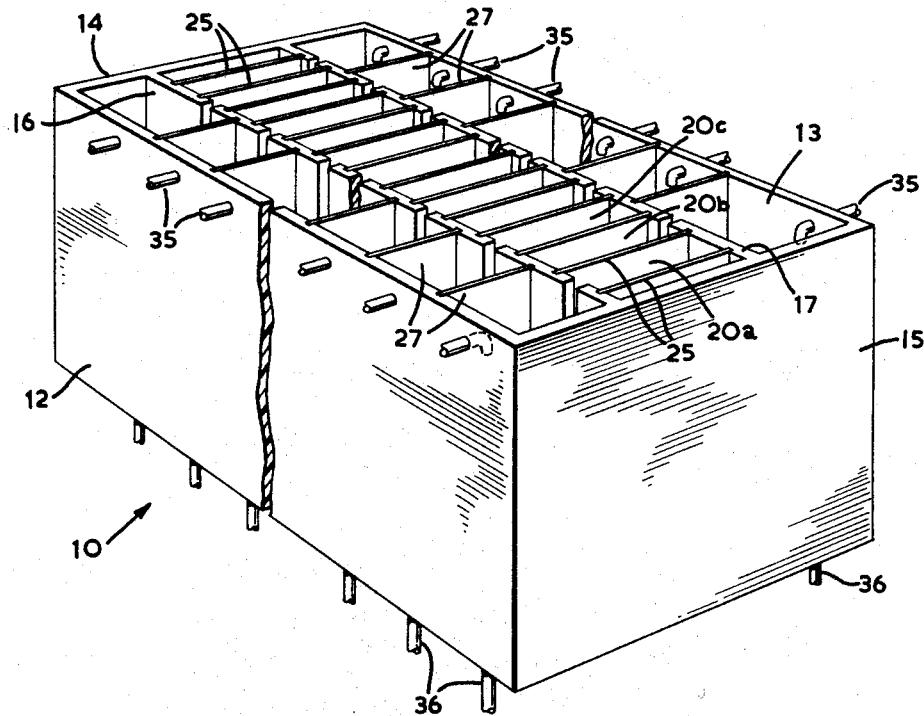

This invention will become more apparent from the following detailed description, taken in conjunction with the appended drawings, in which:

FIGURE 1 is a plan view showing a bipolar electrolytic cell embodying this invention which is useful for cascade operation, FIGURE 2 is a section taken along substantially section line 2—2 in FIGURE 1 and with a part of the electrolytic cell being broken away to reveal certain details of its construction, and FIGURE 3 is a perspective view of a bipolar electrolytic cell embodying this invention which is useful for batch operation.

As used herein, the term "bipolar electrolytic cell" means an electrolytic cell in which, in use, the electrodes are connected in series electrically and in which some of the electrodes are bipolar, i.e., one face functions as an anode and the other face functions as a cathode. This is in contrast to a monopolar electrolytic cell in which all of the anodes are connected in parallel and all of the cathodes are connected in parallel, electrical connections being made between each electrode and the positive or negative terminal of a rectifier.

Referring now to FIGURES 1 and 2, there is shown a bipolar electrolytic cell having a cell tank 10 that is in the form of a large box having an open top, a bottom wall 11, two spaced-apart, parallel side walls 12 and 13 upstanding from bottom wall 11 at right angles thereto, and two other spaced-apart, parallel side walls 14 and 15 also upstanding from bottom wall 11 at right angles thereto and disposed at right angles to side walls 12 and 13. Tank 10 may be fabricated from any material that is an electrical insulator and that is resistant to chemical attack by the electrolyte that is contained in the tank during its use. Where the electrolytic cell is to be used for the production of sodium chlorate from brine at temperatures of the order of 40° C. or less, tank 10 may be fabricated from a suitable polyvinyl chloride. Tank 10 is made liquid-tight, of course.

While tank 10 has been shown to be rectangular in cross-section, this is not essential, and the tank could be of any convenient shape.

Extending between the two side walls 14 and 15 and secured thereto are electrode positioning walls 16 and 17, these being disposed in spaced-apart, parallel relationship with respect to each other and with respect to side walls 12 and 13.

The walls 16 and 17 hold a plurality of electrodes 18a, 18b, 18c . . . 18n in spaced-apart, parallel relationship with respect to each other in the chamber defined by tank 10. As may be seen from FIGURES 1 and 2, this is achieved by means of equally spaced-apart, parallel channels 19a, 19b, 19c . . . 19n, which extend for a portion of the full height of both walls 16 and 17. Channels 19a, 19b, etc., are disposed at right angles to bottom wall 11 with the channels in wall 16 facing and aligned with those in wall 17. The length of each channel 19a, 19b, etc., is the same, and since the top edges 12a, 13a, 16a and 17a of walls 12, 13, 16 and 17 respectively all lie in a flat plane parallel to bottom wall 11, channels 19a, 19b, etc., terminate in ledges (not shown) all of which lie in a flat plane parallel to bottom wall 11. Walls 16 and 17 hold electrodes 18a, 18b, etc., in spaced-apart, parallel relationship with each other by virtue of the electrodes fitting into channels 19a, 19b, etc., as may be seen from FIGURES 1 and 2. If desirable, part of the weight of the electrodes may be taken on the ledges formed at the ends of the channels.

As best shown in FIGURE 1, because electrodes 18a, 18b, etc., all are of the same thickness with flat, parallel faces, and because adjacent channels are equally spaced apart, interelectrode spaces 20a, 20b . . . 20n of constant width (measured between facing surfaces of adjacent electrodes) are provided. Each set of two adjacent electrodes, for example 18a and 18b, and the interelectrodes spaced therebetween, in this case 20a, constitutes a unit cell for the electrolysis of electrolyte occupying the interelectrode space.

Electrodes 18a, 18b, etc., are shown as rectangular plates having flat, parallel faces. If the electrodes were of graphite, each plate would be most likely made up of graphite "planks" sitting one on top of the other, and the "planks" may be made up of blocks positioned side-by-side, all as known in the art. If the electrodes are of magnetite or of platinised titanium (anode) with an iron backing (cathode), for example, the electrodes may be plates as shown. Of course, it will be appreciated that electrodes fabricated from other materials but suitable for bipolar use may be employed. All of the electrodes with the exception of end electrodes 18a and 18n are bipolar, and the latter two are monopolar.

In order to permit sludge that forms during use of the bipolar cell to accumulate without causing short circuits, and in order to support the electrodes and provide a header for each unit cell, spaced-apart supporting plates 21 (FIGURE 2) are provided. These supporting plates 21 or partitions also help to separate adjacent unit cells and extend between walls 16 and 17 and upwardly from bottom wall 11 of tank 10, being positioned at right angles to bottom wall 11. Partitions 21 are in the form of flat plates that are parallel with respect to each other and also parallel to electrodes 18a, 18b, etc. Partitions 21 are held in position by being inserted in channels or grooves in both walls 16 and 17 that constitute extensions of channels 19a, 19b, etc., and which are of the same depth but narrower than channels 19a, 19b, etc., and also by being inserted in channels or grooves 23 in bottom wall 11, channels 23 also extending between walls 16 and 17. The relationship between plates 21 and the grooves in walls 16 and 17 which receive partitions 21, as well as the relationship between partitions 21 and grooves 23, is that of a tongue and groove relationship. Partitions 21, which are provided for each electrode, may be formed from any suitable electrical insulator that is resistant to chemical attack by electrolyte in the tank, and that is sufficiently strong to enable partitions 21 to perform their supporting function. They may be of the same material as tank 10 or of glass, for example. Since partitions 21 support the electrodes above bottom wall 11, a space thereby is provided for accumulation of sludge, in the event that electrodes are employed that create sludge, and this sludge is unable to cause electrical short circuits between adjacent electrodes. This space should be sufficiently deep that sludge accumulation will not hinder the flow of electrolyte into each unit cell.

It will be noted that the electrodes are grooved to receive partitions 21, as best seen in FIGURE 2, the relationship between partitions 21 and the electrodes being a tongue and groove relationship.

Partitions 21 need not be provided for end electrodes 18a and 18n if they are otherwise suitably supported.

Extending between walls 16 and 17 and positioned in grooves 22 are partitions 25 which may be made from the same material as partitions 21. Grooves 22 are centrally disposed in channels 19a, 19b, etc., and extend from the bottom of these channels further into walls 16 and 17, grooves 22 being narrower in width than grooves 19a, 19b, etc., to accommodate partitions 25 in tongue and groove relationship. Partitions 25 are in the form of flat plates positioned in spaced-apart, parallel relationship with respect to each other and parallel to the electrodes.

One such partition 25 is provided for each of the electrodes, although they need not be provided for end electrodes 18a and 18n. As best shown in FIGURE 2, the top edges of the electrodes are grooved at 26 to receive partitions 25, the relationship between partitions 25 and electrodes 18a, 18b, etc., being a tongue and groove relationship. Partitions 25 extend upwardly from the electrodes to the top edges 16a and 17a of walls 16 and 17 respectively.

The various unit cells do not occupy all of the chamber defined by cell tank 10 but are disposed centrally therein with respect to side walls 12 and 13, thus leaving portions of the chamber defined by cell tank 10 defined between the portion of the chamber occupied by the unit cells and the two side walls 12 and 13.

The portions of the chamber defined by tank 10 that are unoccupied by the unit cells are partitioned into a number of individual reaction chambers 28a, 28b, 28c . . . 28n by means of partitions 21 and 25 and partitions designated 27. It is in these chambers that chemical reactions take place forming the desired product.

Partitions 27 may be fabricated from the same material as side walls 12 and 13 and are in the form of plates which extend the depth of tank 10 from the top edges thereof to bottom wall 11. Each partition fits into grooves 31a, 31b and 31c (FIG. 2) in walls 16 and 17, bottom wall 11, and side walls 12 and 13 respectively, grooves 31a extending the full height of walls 16 and 17, grooves 31c extending the full height of side walls 12 and 13 and grooves 31b extending between wall 16 and side wall 12 and between wall 17 and side wall 13. These grooves hold partitions 27 in spaced-apart, parallel relationship with respect to each other. It also will be noted that partitions 27 are parallel to the electrodes. Moreover, each partition 27 is disposed in alignment with a different one of the interelectrode spaces 20a, 20b, etc., between two adjacent electrodes, although this is not essential. In fact, each partition 27 is disposed in alignment with the centre of an interelectrode space. It also will be seen from FIGURE 1 that the number of partitions 27 is one less than the number of all bipolar electrodes.

Cut in walls 16 and 17 at the tops and bottoms thereof are openings 32 and 33. Only one set of such openings is provided for each unit cell, and these openings constitute the means whereby the various unit cells are connected to the individual reaction chambers 28a, 28b, etc., in liquid-flow relationship for passage of electrolyte into a unit cell from its individual reaction chamber through opening 33 and for the passage of electrolyte from the unit cell into its individual reaction chamber through opening 32.

When the bipolar electrolytic cell of FIGURES 1 and 2 is used for cascade operation, tubes 34 are employed. As best shown in FIGURE 1, each partition 27 is provided with one of such tubes 34, each tube passing through one of partitions 27 to connect adjacent reaction chambers in liquid-flow relationship. Current leakage through tubes 34 can be made very small by making these tubes of small diameter and/or greater length. It also will be noted that tubes 34 connect the unit cells and their associated individual reaction chambers in series liquid-flow relationship with each other.

The arrangement of partitions 27 and openings 32 and 33 is such that even numbered ones of the unit cells (starting at 18b) are directly connected in liquid-flow relationship with only the individual reaction chambers on one side of tank 10, while odd numbered ones of the unit cells (starting at 18a) are directly connected in liquid-flow relationship with only the individual reaction chambers on the other side of tank 10.

In order to introduce electrolyte into tank 10, an inlet tube or pipe 35 communicating with reaction chamber 28a through bottom wall 11 is provided. Electrolysed solution is removed from tank 10 via a tube or pipe 36 (FIGURE 1) extending through bottom wall 11 into reaction chamber 28n. Communication between reaction chambers 28g and 28h is established by means of a tube or pipe 37 passing through bottom wall 11 into reaction chambers 28g and 28h.

With a bipolar electrolytic cell of the type shown in FIGURES 1 and 2, except for any minimal current leakage which may occur through tubes 34, and this can be minimised by making these tubes of small diameter and/ or greater length, as aforementioned, there can be substantially no current leakage between adjacent unit cells, if good seals are effected between the various partitions, the various electrodes and walls 11, 12, 13, 16 and 17, all of which seals should be as liquid-tight as possible.

As shown in FIGURE 1, a D.C. power source 38 is provided having positive and negative output terminals 39 and 40 respectively. These output terminals are connected to lead-in conductors 41 and 42 respectively, which are connected to electrodes 18n and 18a respectively for the supply of electrical energy to the electrolytic cell. It will be seen that electrodes 18a . . . 18n are electrically connected in series with each other. If desired, more electrodes than just end electrodes 18a and 18n may be connected to D.C. power source 38. Thus, if there are seventeen electrodes, electrodes 1, 9 and 17 may be connected to terminal 39 and electrodes 5 and 13 may be connected to terminal 40.

In the operation of the electrolytic cell of FIGURES 1 and 2 to produce sodium chlorate from brine, the brine solution is introduced into tank 10, more particularly reaction chamber 28a thereof, via pipe 35 and flows into the interelectrode space 20a between electrodes 18a and 18b through opening 33 communicating therewith. Electrolysis of the electrolyte in this interelectrode space occurs, and reactions in this electrolysis zone 20a of the type hereinbefore noted in Equations 1 and 2 take place. The electrolyte in interelectrode space 20a flows through opening 32 communicating therewith into reaction chamber 28a where a chemical reaction of the type hereinbefore noted in Equation 6 takes place, and the electrolyte then is returned to electrolysis zone 20a through opening 33. A part of the electrolyte is passed into reaction chamber 28b via tube 34 connecting reaction chambers 28a and 28b and is similarly processed in this reaction chamber 28b and the unit cell associated therewith constituting electrodes 18c and 18d and interelectrode space or electrolysis zone 20c. In this manner the electrolyte passes in series from one odd numbered unit cell and its associated reaction chamber to the next. It is then passed via tube 37 to reaction chamber 28h and passes in series through each even numbered unit cell and its associated individual reaction chamber until the electrolysed solution finally is removed via pipe 36. Except for current leakage which may occur through tubes 34, there is substantially no current leakage between adjacent unit cells. In this regard, it will be appreciated, of course, that partitions 25 are sufficiently high and openings 32 sufficiently deep to prevent flow of electrolyte from one unit cell to an adjacent unit cell.

If desired, the functions of inlet pipe 35 and outlet pipe 36 can be reversed from time to time. This may prolong electrode life.

The only members separating the individual reaction chambers from their associated unit cells are walls 16 and 17, and openings 32 and 33 therein can be made as large as desired, consistent with the ability of walls 16 and 17 to hold the electrodes in position not being impaired, to obtain good circulation of electrolyte. There is no restriction placed on the size of openings 32 and 33 to avoid current leakage between adjacent unit cells, as in the case of prior art bipolar electrolytic cells wherein these openings were provided in tubes that had to be of small diameter to minimize current leakage. Thus, because the path between each unit cell and its reaction chamber offers a low resistance to the flow of electrolyte, as compared with that offered by the inlet and outlet tubes of prior art electrolytic cells, very efficient circulation of electrolyte between a unit cell and its associated reaction chamber is achieved.

In the production of sodium chlorate the cell may be fed via pipe 35 with unsaturated or preferably saturated (about 300 gm./l.) solutions of sodium chloride, or with solutions containing NaCl plus varying amounts of sodium chlorate to produce a cell liquor product containing varying amounts of sodium chloride and sodium chlorate. The sodium chloride concentration through the unit cells to the unit cell defined by end electrode 18n, the electrode adjacent to it, and interelectrode space 20n, decreases progressively so that an electrolyzed solution having a desirable composition can be produced on a continuous basis without sacrificing current efficiency in all of the unit cells. Cell liquors containing about 100 gm./l. of sodium chloride and about 450 gm./l. of sodium chlorate may be produced, or even higher amounts of sodium chlorate can be produced by the addition of sodium chloride to the liquors in intermediate cells. Liquors particularly suitable for use in generators or plants for the manufacturing of chlorine dioxide can also be produced.

Because of the very minimal current leakage which will occur with a properly constructed cell of the type shown in FIGURES 1 and 2, D.C. power source 38 may be of a type producing a higher voltage than is commonly used with bipolar electrolytic cells for chlorate production with the consequent advantages hereinbefore noted.

It should be appreciated that in the embodiments of my invention hereinbefore described, no cooling coils have been indicated, since these devices will not be required if platinised titanium electrodes, for example, are employed. If graphite electrodes are employed, however, cooling coils may be provided and may be inserted in the various reaction chambers, preferably between each set of two adjacent partitions 27. Because of the high degree of electrolyte circulation obtained with a bipolar electrolytic cell embodying this invention between a unit cell and its associated individual reaction chamber, it should be possible to employ less expensive cooling coils than have been employed with prior art bipolar cells for chlorate production.

A significant advantage of an electrolytic cell embodying this invention is that it only requires one less number of partitions 27 than the number of bipolar electrodes in the bipolar electrolytic cell. This decreases the cost of the cell both from the point of view simplifying the design and assembly of the cell and reducing the cost of materials used in constructing the cell, as compared with the cell described in detail in copending application Ser. No. 490,199, filed Sept. 27, 1965.

The electrolytic cell of FIGURE 3 is in all respects identical to that shown in FIGURES 1 and 2 with the exception that tubes 34 have been eliminated, so that there are no openings in partitions 27, tube 37 has been eliminated, and tubes 35 and 36 have been arranged to introduce electrolyte into and remove electrolyte from each unit cell and its associated reaction chamber, each such unit cell and its associated reaction chamber thereby being capable of operating on a batch basis or a continuous basis. Electrolyte is introduced to each unit cell and its respective reaction chamber by a different one of tubes 35, is processed on a batch or continuous basis in the unit cell and its reaction chamber until the desired product has been formed, and, when a batch process is being used, the reaction then is removed via a different one of pipes 36 by opening valves (not shown) connected to these pipes.

If desired, the electrodes may be split. Thus, each electrode may be divided in two with an upstanding spacer between the parts thereof. In this event, each unit cell would contain four electrodes rather than just two.

From the foregoing it will be seen that, unlike the prior art, there is no common chamber which receives electrolyte from and delivers electrolyte to all the unit cells. In contrast, each unit cell has its own reaction chamber, so that the unit cells are isolated from each other with respect to any substantial degree of electrical current leakage therebetween. Hence, the path between each unit cell and its reaction chamber can be designed to offer little resistance to the flow of electrolyte. Thus, in a cell embodying this invention, low current leakage but very good electrolyte circulation both can be obtained, whereas, in a prior art cell, one can be obtained only at the expense of the other. In other words, if the inlet and outlet tubes between the unit cells and the common reaction chamber of prior art apparatus are designed to offer less resistance to electrolyte flow by making these tubes shorter and/or larger, current leakage will increase, and if they are designed to offer more resistance to current leakage by making them longer and/or smaller, the resistance that they offer to electrolyte flow will increase. In an electrolytic cell embodying this invention, since the total volume defined by the individual chambers plus the volumes of the electrolysis zones constitutes the only volume (no common reaction chamber) provided for chemical reactions as a result of electrolysis of the electrolyte to take place in the electrolyte, this same problem of having to compromise between electrical current leakage and obtaining good electrolyte circulation is avoided.

A cell embodying this invention is also well suited to the recovery for subsequent use of the hydrogen which is generated in the cells, particularly when platinised titanium anodes are employed.

While preferred embodiments of this invention have been disclosed herein, those skilled in the art will appreciate that changes and modifications may be made therein without departing from the spirit and scope of this invention as defined in the appended claims.

What I claim as my invention is:

1. A bipolar electrolytic cell comprising a cell tank having a bottom wall and side walls defining a first chamber; at least three electrodes positioned in said first chamber in spaced-apart relationship with respect to each other, at least one of said electrodes being a bipolar electrode, said electrodes of each set of two adjacent electrodes having surfaces facing each other, each set of two adjacent electrodes and the space therebetween constituting a unit cell for the electrolysis of an electrolyte occupying the space between said two adjacent electrodes, the space between said two adjacent electrodes constituting an electrolysis zone in which electrolysis of said electrolyte can take place, said unit cells occupying only a first portion of said first chamber, said first portion being spaced inwardly from two opposite side walls of said tank, whereby second and third portions of said first chamber are defined between said first portion and said two side walls; and means for isolating said unit cells from each other with respect to any substantial degree of electrical current leakage therebetween during operation of said bipolar electrolytic cell, said last-mentioned means defining a plurality of individual second chambers, first ones of said second chambers being physically separated from said third portion of said first chamber, at least parts of said first ones of said second chambers being located in said second portion of said first chamber, second ones of said second chambers being physically separated from said second portion of said first chamber, at least parts of said second ones of said second chambers being located in said third portion of said first chamber, said last-mentioned means including partitioning means located in said second and third portions of said first chamber, said partitioning means separating said parts of said first ones of said second chambers from each other and separating said parts of said second ones of said second chambers from each other, each one of said second chambers being connected in liquid-flow relationship with a different one of said unit cells for passage of electrolyte into respective ones of said unit cells from said second chambers connected to said unit cells and out of respective ones of said unit cells into said second chambers connected to said unit cells, even numbered ones of said unit cells being connected in liquid-flow relationship with only those ones of said second chambers having said parts thereof located in said second portion of said first chamber, odd numbered ones of said unit cells being connected in liquid-flow relationship with only those ones of said second chambers having said parts thereof located in said third portion of said first chamber.

2. A bipolar electrolytic cell according to claim 1 wherein each one of said second chambers is connected in liquid-flow relationship with a different one of said unit cells for passage of electrolyte into respective ones of said unit cells from said second chambers connected to said unit cells and out of respective ones of said unit cells into said second chambers connected to said unit cells via a path characterized by a low resistance to the flow of electrolyte.

3. A bipolar electrolytic cell according to claim 1 wherein the number of said partitioning means is one less than the number of said bipolar electrodes and there are at least two of said bipolar electrodes.

4. A bipolar electrolytic cell according to claim 3 wherein each one of said partitioning means is disposed in alignment with a different one of the spaces between two adjacent electrodes.

5. A bipolar electrolytic cell according to claim 1 including means connecting said second chambers and said unit cells in series liquid-flow relationship wth each other.

6. A bipolar electrolytic cell according to claim 5 wherein said means connecting said second chambers and said unit cells in series liquid-flow relationship with each other are small openings.

7. A bipolar electrolytic cell according to claim 5 wherein said means connecting said second chambers and said unit cells in series liquid-flow relationship with each other are passages characterized by a high resistance to current flow during operation of said bipolar electrolytic cell.

8. A bipolar electrolytic cell comprising a cell tank having a bottom wall and side walls defining a first chamber; at least three electrodes positioned in said first chamber in spaced-apart relationship with respect to each other, at least one of said electrodes being a bipolar electrode, said electrodes of each set of two adjacent electrodes having surfaces facing each other, each set of two adjacent electrodes and the space therebetween constituting a unit cell for the electrolysis of an electrolyte occupying the space between said two adjacent electrodes, the space between said two adjacent electrodes constituting an electrolysis zone in which electrolysis of said electrolyte can take place, said unit cells occupying only a first portion of said first chamber, said first portion being spaced inwardly from two opposite side walls of said tank, whereby second and third portions of said first chamber are defined between said first portion and said two side walls; means defining a plurality of individual second chambers, first ones of said second chambers being physically separated from said third portion of said first chamber, at least parts of said first ones of said second chambers being located in said second portion of said first chamber, second ones of said second chambers being physically separated from said second portion of said first chamber, at least parts of said second ones of said second chambers being located in said third portion of said first chamber, said last-mentioned means including partitioning means located in said second and third portions of said first chamber, said partitioning means separating said parts of said first ones of said second chambers from each other and separating said parts of said second ones of said second chambers from each other, each one of said second chambers being connected in liquid-flow relationship with a different one of said unit cells for passage of electrolyte into respective ones of said unit cells from said second chambers connected to said unit cells and out of respective ones of said unit cells into said second chambers connected to said unit cells, even numbered ones of said unit cells being connected in liquid-flow relationship with only those ones of said second chambers having said parts thereof located in said third portion of said first chamber, odd numbered ones of said unit cells being connected in liquid-flow relationship with only those ones of said second chambers having said parts thereof located in said second partition of said first chamber, the total volume defined by said second chambers plus the volume of said electrolysis zones constituting substantially the only volume provided for chemical reactions as a result of electrolysis of said electrolyte to take place in said electrolyte.

9. A bipolar electrolytic cell according to claim 8 wherein each one of said second chambers is connected in liquid-flow relationship with a different one of said unit cells for passage of electrolyte into respective ones of said unit cells from second chambers connected to said unit cells and out of respective ones of said unit cells into said second chambers connected to said unit cells via a path characterized by a low resistance to the flow of electrolyte, each unit cell being substantially isolated from every other unit cell with respect to leakage of electrical current between said unit cells.

10. A bipolar electrolytic cell according to claim 9 including means connecting said second chambers and said unit cells in series liquid-flow relationship with each other.

11. A bipolar electrolytic cell according to claim 10 wherein said means connecting said second chambers and said unit cells in series liquid-flow relationship with each other are small openings.

12. A bipolar electrolytic cell according to claim 10 wherein said means connecting said second chambers and said unit cells in series liquid-flow relationship with each other are passages characterized by a high resistance to current flow during operation of said bipolar electrolytic cell.

13. A bipolar electrolytic cell comprising a cell tank having a bottom wall and side walls defining a first chamber; at least three electrodes positioned in said first chamber in spaced-apart relationship with respect to each other, at least one of said electrodes being a bipolar electrode, said electrodes in each set of two adjacent electrodes having surfaces facing each other, each set of two adjacent electrodes and the space therebetween constituting a unit cell for the electrolysis of an electrolyte occupying the space between said two adjacent electrodes, the space between said two adjacent electrodes constituting an electrolysis zone in which electrolysis of said electrolyte can take place, said unit cells occupying only a first portion of said first chamber, said first portion being spaced inwardly from two opposite side walls of said tank, whereby second and third portions of said first chamber are defined between said first portion and said two side walls; means defining a plurality of individual second chambers, first ones of said second chambers being physically separated from said third portion of said first chamber, at least parts of said first ones of said second chambers being located in said second portion of said first chamber, second ones of said second chambers being physically separated from said second portion of said first chamber, at least parts of said second ones of said second chambers being located in said third portion of said first chamber, said last-mentioned means including partitioning means located in said second and third portions of said first chamber, said partitioning means seperating said parts of said first ones of said second chambers from each other and separating said parts of said second ones of said second chambers from each other, each one of said second chambers being connected in liquid-flow relationship with a different one of said unit cells for passage of electrolyte into respective ones of said unit cells from said second chambers connected to said unit cells and out of respective ones of said unit cells into said second chambers connected to said unit cells, even numbered ones of said unit cells being connected in liquid-flow relationship with only those ones of said second chambers having said parts thereof located in said third portion of said first chamber, odd numbered ones of said unit cells being connected in liquid-flow relationship with only those ones of said second chambers having said parts thereof located in said second portion of said first chamber, the total volume defined by said second chambers plus the volume of said electrolysis zones constituting substantially the only volume provided for chemical reactions as a result of electrolysis of said electrolyte to take place in said electrolyte; means for introducing an electrolyte into said first chamber; means for withdrawing an electrolysed solution from said first chamber; and means connected to ones of said electrodes other than bipolar electrodes for supplying electrical energy to said bipolar electrolytic cell.

14. A bipolar electrolytic cell according to claim 13 including means connecting said second chambers and said unit cells in series liquid-flow relationship with each other.

15. A bipolar electrolytic cell according to claim 14 wherein the number of said partitioning means is one less than the number of said bipolar electrodes and there are at least two of said bipolar electrodes.

16. A bipolar electrolytic cell according to claim 13 wherein each unit cell is substantially isolated from every other unit cell with respect to leakage of electrical current between said unit cells.

17. A bipolar electrolytic cell according to claim 16 wherein the number of said partitioning means is one less than the number of said bipolar electrodes and there are at least two of said bipolar electrodes.

18. A bipolar electrolytic cell comprising a cell tank having a bottom wall and side walls defining a first chamber; at least three electrodes, at least one of said electrodes being a bipolar electrode; means holding said electrodes in spaced-apart substantially parallel relationship with respect to each other in said first chamber with said electrodes in each set of two adjacent electrodes having surfaces facing each other, each set of two adjacent electrodes and the space therebetween constituting a unit cell for the electrolysis of an electrolyte occupying the space between said two adjacent electrodes, the space between said two adjacent electrodes constituting an electrolysis zone in which electrolysis of said electrolyte can take place, said unit cells occupying only a first portion of said first chamber, said first portion being spaced inwardly from two opposite side walls of said tank, whereby second and third portions of said first chamber are defined between said first portion and said two side walls; first spaced-apart partitions corresponding in number to at least the number of said bipolar electrodes and extending between said means holding said electrodes and upstanding from said bottom wall of said tank, each of said first partitions supporting a different one of said bipolar electrodes and supporting said bipolar electrode spaced from said bottom wall of said tank, whereby a space is provided between said bottom wall of said tank and said bipolar electrodes; second spaced-apart partitions corresponding in number to at least the number of said bipolar electrodes and extending between said means holding said electrodes, each of said second partitions being supported on a different one of said bipolar electrodes and extending from said bipolar electrode away from said bottom wall; third spaced-apart partitions disposed in said second portion of said first chamber and extending between one of said two side walls and one of said means holding said electrodes; fourth spaced-apart partitions disposed in said third portion of said first chamber and extending between the other of said two side walls and another of said means holding said electrode, said third and fourth partitions dividing at least parts of said second and third portions of said chamber into a plurality of individual reaction chambers; each one of said individual reaction chambers being connected in liquid-flow relationship with a different one of said unit cells along a path including the aforementioned space for passage of electrolyte into respective ones of said unit cells from said individual reaction chambers connected to said unit cells and out of respective ones of said unit cells into said individual reaction chambers connected to said unit cells, even numbered ones of said unit cells being connected in liquid-flow relationship with only those ones of said individual reaction chambers in said second portion of said first chamber, odd numbered ones of said unit cells being connected in liquid-flow relationship with only those ones of said individual reaction chambers in said third portion of said first chamber.

19. A bipolar electrolytic cell according to claim 18 including means connecting said individual reaction chambers and said unit cells in series liquid-flow relationship with each other, said last-mentioned means including openings in said third and fourth partitions connecting adjacent ones of said individual reaction chambers in liquid-flow relationship and means connecting one of said individual reaction chambers in said second portion of said first chamber with one of said individual reaction chambers in said third portion of said first chamber.

20. A bipolar electrolytic cell according to claim 18 wherein said tank, said electrodes, said means holding said electrodes and said first, second, third and fourth partitions are constructed and arranged to substantially isolate said unit cells from each other with respect to current leakage therebetween.

References Cited

UNITED STATES PATENTS 968,492    8/1910    McDorman _____ 204—268

FOREIGN PATENTS 505,874    5/1920    France.

JOHN H. MACK, *Primary Examiner.*

D. R. JORDAN, *Assistant Examiner.*